United States Patent Office 3,851,066
Patented Nov. 26, 1974

3,851,066
METHOD FOR PREPARING PROTEIN ENRICHED YEAST-RAISED BAKED PRODUCTS
Roy Kenneth Langhans, Newark, Del., assignor to ICI America Inc., Wilmington, Del.
No Drawing. Filed Aug. 30, 1971, Ser. No. 176,287
Int. Cl. A21d 2/14, 2/16, 2/26
U.S. Cl. 426—21                    4 Claims

ABSTRACT OF THE DISCLOSURE

Yeast-raised baked products containing flour and additional edible protein such as fish protein concentrate are improved in palatability and color by the addition to the dough ingredients of emulsifiers such as ethoxylated monoglycerides; ethoxylated esters of sorbitol, sorbitan, and isosorbides; salts of fatty acid-lactylic acid derivatives; succinylated monoglycerides and ethoxylated fatty alcohols.

---

The invention relates to protein enriched, yeast-raised baked products. More particularly, the invention relates to protein enriched, yeast-raised baked products containing selected emulsifiers which in addition to conditioning the dough and inhibiting staling of the finished product further increase its palatability and color.

High protein cereal foods have received much emphasis in recent years as an approach to alleviating world hunger and malnutrition. This approach appears feasible because of the widespread use of cereal products throughout the world. To render baked products more effective in combating protein malnutrition much work has been devoted to fortifying them with additional protein. In view of the shortage of high protein foods, many governments have directed their efforts towards developing an abundant and easily obtainable source of protein and a method for its distribution in food products. One such source which meets this demand is edible fish protein concentrate.

A major problem which relates to the use of such material in the fortification of yeast-raised baked products is the reduction of the aesthetic qualities of the baked products. For instance, in bread containing up to 10 to 15% added fish protein concentrate, a coarse dense crumb and significantly reduced loaf volume result. Furthermore, the dense crumb produces a darker color.

Previous approaches used in solving the problem associated with protein enriched baked goods were directed toward modifying the protein source per se. Such methods are disclosed in British Patent 901,110; Canadian Patent 698,664; U.S. Patent 3,252,807; and U.S. Patent 3,076,710.

It is an object of the invention to provide a process for producing protein enriched, yeast-raised baked goods having improved palatability and color.

It is another object of the present invention to provide a protein enriched dough which contains a selected emulsifier composition and which is useful in preparing protein enriched bread having improved texture and color.

The foregoing objects and still further objects of the present invention may be accomplished by adding to the ingredients a select group of emulsifiers.

The protein enriched, yeast-raised baked products which are contemplated for preparation in accordance with this invention and which are embraced within its purview comprise bread and bread-like products which normally contain not more than about 5% by weight of shortening and not more than about 8% by weight of residual (unfermented) sugar and 5–20% by weight, based on the amount of flour added, of an edible protein source.

These emulsifiers, which may or may not be used in conjunction wtih monoglycerides, are of the type consisting essentially of ethoxylated monoglycerides; ethoxylated esters off sorbitol, sorbitan, and isosorbides; salts of fatty acidlactylic acid derivatives; succinylated monoglycerides; ethoxylated fatty alcohols; and mixtures thereof.

"Monoglycerides" comprise a class of monoesters of mixed monoesters and diesters of glycerine and fatty acids. Typically, monoglyceride, compositions suitable for use in accordance with the invention are those having an iodine value within the range of 1 to about 70. These monoglycerides are usually prepared by conventional methods of glycerolysis of edible fats and oils; that is, by reacting glycerine with a fatty acid, glyceride, or other fatty acid ester or by directly esterifying glycerine with a fatty acid having from 12 to about 22 carbon atoms. Typical of such glycerides are glyceryl monooleate, glyceryl monostearate, and glyceryl monopalmitate.

"Suncсinylated monoglycerides" are succinyl halfesters formed by reacting one mol of succinic acid with one mol of the above-described monoglycerides. These materials are usually prepared by reacting succinic anhydride with a monoacylated glyceride as further described in U.S. Pat. 3,293,272.

"Ethoxylated monoglycerides" are reaction products of the above-described monoglycerides with ethylene oxide to monoglyceride ranging from 4 to 40. Typically, these condensation products contain from 10 to 95 weight percent of ethylene oxide based on 100 parts by weight of ethoxylated monoglyceride. More commonly, these additives will contain from 25 to 80 weight of ethylene oxide and 15 and 25 mole of ethylene oxide per mol of monoglyceride. Procedures for making these materials are further described in U.S. Pat. 3,433,645.

"Ethoxylated fatty acid esters of sorbitol, sorbitan, and isosorbide" which includes the monoesters, diesters, and some triesters of sorbitol and the monoesters and diesters of sorbitan and isosorbide act as a hydrophilic emulsifier in the bread making process. The fatty acids which may be used to prepare the ethoxylated esters are, in general, those having 12 to 22 carbon atoms such as stearic acid, palmitic acid, lauric acid, oleic acid, behenic acid, and saturated fatty acids having more than 12 carbon atoms. Polyoxyethylene derivatives of the sorbitan and isosorbide fatty acid esters (either mono or diesters) may be prepared by reacting sorbitan or isosorbide with ethylene oxide prior to esterification, or by preparing a partial sorbitan or isosorbide fatty acid ester first and thereafter reacting the fatty acid ester with ethylene oxide. The preparation of polyoxyethylene fatty acid esters of sorbitan and isosorbide is further described in U.S. Pat. 2,380,166, while procedures for preparing ethoxylated sorbitol fatty acid esters are further described in U.S. Pat. 1,959,930.

"Polyoxyethylene derivatives of long-chain aliphatic alcohols" are usually made by reacting a fatty alcohol with ethylene oxide under pressure in the presence of a basic catalyst. The alcohols which form suitable ethers comprise acyclic unsubstituted, preferably straight-chain monohydric alcohols containing from 12 to 22 carbon atoms and no oxygen other than the hydroxyl radical. The alcohols may be unsaturated, although it is preferred to select those containing no more than 2 carbon-to-carbon double bonds. Preferred alcohols include lauryl, myristyl, cetyl, stearyl, eicosyl, dococyl, oleyl, issoleyl, lonoleyl, and erucyl, and mixtures of these obtained by the reduction of fatty acids or esters occurring in natural fats and oils. Suitable emulsifiers are prepared by condensing from 4 to 40 mols of ethylene oxide with a mol of alcohol. Preferred compositions are made by condensing 4–10 mols per mol of alcohol. Preferred compositions are obtained by reacting alcohols having approximately 16 to 20 carbon atoms in the chain with 6–18 mols of ethylene oxide.

"Sodium and calcium salts of fatty acid esters of lactylic acid" are formed by reacting quantitative amounts of the fatty acid and lactylic acid in the presence of basic sodium or calcium salts. Useful emulsifiers are also prepared by reacting 1 to 4 mols of lactylic acid per mol of fatty acid having 12–22 carbon atoms. Further procedures for making fatty acid esters of lactylic acids are disclosed in U.S. Patent 2,733,252. Particularly preferred are the salts of calcium and sodium which are reaction products between 1 mol of fatty acid and 1–4 mols of lactylic acid. A particularly preferred fatty acid is stearic acid. Most preferred are those emulsifiers made by reacting sodium or calcium bases with 1 equivalent of stearic acid and 2 equivalents of lactic acid to form calcium or sodium stearoyl(1–2)lactylate.

The use of emulsifiers such as ethoxylated monoglycerides, succinylated monoglycerides, ethoxylated sorbitol esters, ethoxylated sorbitol anhydrides, ethoxylated long-chain fatty alcohols, and alkaline salts of fatty acid lactylic esters are individually useful in preparing the protein enriched bread products according to the methods of the present invention. However, it has been found that the use of combinations of these emulsifiers with monoglycerides prove to yield the best results. For example, combinations of monoglycerides with ethoxylated derivatives and the other emulsifiers above-named prove to give significantly better bread properties.

An emulsifier blend useful in the preparation of protein enriched, yeast-raised bread products according to the methods of the present invention may be easily prepared by mixing with suitable agitation the above-described monoglyceride with a polyoxyethylene derivative of a sorbitol, sorbitan, or isosorbide fatty acid ester. The resulting blend is usually, although not necessarily, a plastic mass which is easily dispersed in dough or in the shortening. The emulsifier blend may comprise as high as about 80% by weight monoglyceride and as little as about 20% by weight polyoxyethylene sorbitol, sorbitan, or isosorbide fatty acid ester or as little as about 40% by weight monoglyceride and as high as about 60% by weight polyoxyethylene sorbitol, sorbitan, or isosorbide fatty acid ester.

Likewise, combinations containing between 40 and 80% mono and diglycerides and 20 to 60% ethoxylated mono and diglycerides produce similar results. Blends of monoglycerides with ethoxylated derivatives having between 50 and 60% by weight of monoglyceride are a preferred combination. Similar blends of monoglycerides with other emulsifiers in the group can be considered to provide similar improvements.

Optimally, the emulsifier blend is incorporated into the bread in an amount equivalent to about 0.4–1.0% based upon the weight of the flour in the dough when the dough contains from 5 to 20% (based on the total weight of the flour) of an edible protein source; higher and lower amounts of the emulsifiers are useful in some instances, depending upon the source of the protein, and can run as high as 2.5% based upon the total weight of the flour in the mix.

While the protein content of normal wheat flours ranges from 10 to 13%, such protein is not of high nutritive value due to its amino acid deficiency and especially lysine. Therefore, protein enrichment additives should be high in amino acids; and many high protein materials such as wheat gluten, flour, soybean flour, powered milk products, milk casein, synthetic protein, protein compositions derived from fish, and synthesized amino acids can be added to nutrition-deficient cereal flours in proportions of 5 to 20% to enrich baked bread and bread-like products. Of particular interest are those derived from fish which are manufactured from tramp fish by more recently developed processes such as disclosed in U.S. Patent 3,589,606. Most preferred as bread additives are those obtained from soybean by-products, fish, and vital wheat glutens since they average 70 to about 90% by weight of amino acids. By adding 20% by weight of the total flour added to the bread dough of one of these high protein content sources, one can easily triple the protein content of the baked bread product and magnify the useful amino acid concentration by an order of magnitude.

The introduction of the protein-containing ingredient can be added with the flour in either the sponge or the dough portion of conventional baking processes. However, it is preferred to add the protein source with the dough rather than the sponge since some protein sources have a tendency to interfere with the fermentation process and thereby result in breads having lower volumes.

In the examples which follow, a standard bread formulation shown in the following table indicates that the emulsifier and protein source are incorporated with the dough; but the scope of the invention is not limited to its formulation or procedure.

BREAD FORMULA

|  | Grams | Percent (flour as 100) |
|---|---|---|
| Sponge: |  |  |
| Flour | 865.0 | 65 |
| Water | 493.0 | [1] 37.2 |
| Yeast | 33.3 | 2.5 |
| Yeast food | 6.6 | 0.5 |
| Dough: |  |  |
| Protein source | [2] | 5–20 |
| Flour | 465.0 | 35 |
| Sugar | 106.3 | 8 |
| Salt | 26.6 | 2 |
| Shortening (lard) | 40.0 | 3 |
| Nonfat dry milk solids | 80.0 | 6 |
| Water | 372.0 | [1] 28.2 |
| Emulsifier | 5.3, 6.6, 10.6 | 0.4, 0.5, 0.8 |

[1] Variable, based on farinograph absorption. Use of 57% H₂O in sponge and 43% H₂O in dough of total amount.
[2] Variable.

*Procedure*

All ingredients are at room temperature (approximately 70° F.). The sponge ingredients are kneaded in a 12-qt. Hobart bowl, utilizing a standard dough hook, for 5 minutes at low speed. The yeast and yeast food are dissolved first in part of the sponge water, and added as liquids. The dough is fermented 4.5 hours at 86° F. and 75% R.H.

The fermented sponge is added to the mixer, as are all remaining ingredients. When no protein is added, the dough is mixed approximately 8 minutes more on medium speed; however, the addition of protein requires a longer period, usually 10–18 minutes, depending on the Farinograph results and protein source used.

The dough is then fermented for 20 minutes at 86° F., 75% R.H.

After fermentation, the dough is divided into 18-oz. pieces, rounded, placed into bread pans, and allowed a 10-minute proof at 86° F., 75% R.H.

After proofing, the dough is sheeted, moulded, sealed, and placed into bread pans. The dough is then proofed at 100° F., 85% R.H., to template height (approximately 1⅛ inches above pan in 55 to 60 minutes).

Bake at 425° F. for 20 minutes.

The volume (in cc's) of each loaf is measured in a loaf volumeter approximately 1 hour after baking. The loaves are then sealed in plastic bags and stored at constant conditions (ca. 71° F., 64% R.H.) for a period of 6 days.

After 3 days and 6 days of storage, the loaves are sliced (½-inch slices), using an Oliver Slicing Machine (#777). The slices are then observed for softness, grain, texture, crumb, color, and other visible characteristics.

Grain quality is judged using the following scale:

| Subjective Rating: | Numerical Rating |
|---|---|
| Very Good | 11 |
| Good | 8 |
| Fair | 5 |
| Poor | 2 |

Crumb color brightness is determined by a reflectometer reading which indicates whiteness. The higher numbers indicate whiter bread.

Examples illustrating the improving effect of emulsifiers in protein enriched products are shown in Table III. The protein sources used are listed in Table I, while the emulsifiers are listed in Table II. All ingredients shown in Examples 1–22 are percent by weight based on the total weight of the flour. The controls, which contain no emulsifier, apply to those examples immediately above them in the list.

TABLE I

| Protein source | Description | Percent protein* | Trade-mark |
|---|---|---|---|
| A | Whey | 11.3 | Nutrietek 250. |
| B | do | 10.9 | Teklac. |
| C | Soybean protein isolate | 89.7 | Supro 610. |
| D | Fish protein concentrate | 84.6 | |
| E | Vital wheat gluten | 70.7 | Vicrum. |
| F | Bread flour | 10.5 | |

*By standard Kjeldahl analysis.

TABLE II

| Code | Emulsifier compositiln (percent by weight) |
|---|---|
| G | 60% mono-diglyceride of fat-forming fatty acids (ca. 56% alpha mono) from a lard tallow blend (iodine value ca. 37.5); 40% polyoxyethylene(20)sorbitan monostrearate. |
| H | 48% mono-diglycerides of fat-forming fatty acids; 12% fat; and 40% ethoxylated mono and diglycerides (ca. 50% ethylene oxide). |
| I | Sodium stearoyl-2-lactylate. |
| J | Calcium stearoyl-2-lactylate. |

TABLE III

| Example No. | Protein added Percent | Protein added Code [1] | Emulsifier Percent | Emulsifier Code [2] | Loaf volume, total cc. | Grain, 6 days (average) | Color |
|---|---|---|---|---|---|---|---|
| 1 | 5 | D | 0 | | 2,450 | 8.0 | |
| 2 | 5 | D | .6 | G | 2,706 | 8.8 | |
| 3 | 10 | D | 0 | | 2,406 | 7.3 | |
| 4 | 10 | D | .8 | G | 2,703 | 8.0 | |
| 5 | 10 | D | .4 | G | 2,437 | 6.9 | |
| Control A | 10 | D | 0 | | 2,163 | 2.0 | |
| 6 | 5 | D | .5 | G | 2,506 | | 0.570 |
| Control B | 5.0 | D | 0 | | 2,256 | | 0.557 |
| 7 | 7.5 | D | .5 | G | 2,488 | | 0.538 |
| Control C | 7.5 | D | 0 | | 2,225 | | 0.515 |
| 8 | 10.0 | D | .5 | G | 2,463 | | 0.501 |
| Control D | 10 | D | 0 | | 2,019 | | 0.472 |
| 9 | 10 | D | .4 | J | 2,310 | 8.0 | |
| 10 | 10 | E | .4 | J | 2,722 | 9.9 | |
| 11 | 10 | A | .4 | J | 2,594 | 11.0 | |
| 12 | 10 | B | .4 | J | 2,398 | 10.3 | |
| 13 | 10 | C | .4 | J | 1,848 | Poor | |
| 14 | 10 | D | .5 | G | 2,456 | | 0.521 |
| 15 | 10 | D | .5 | I | 2,484 | | 0.528 |
| 16 | 10 | D | .5 | H | 2,494 | | 0.534 |
| Control E | 10 | D | 0 | | 2,231 | | 0.500 |
| 17 | 15 | D | .5 | G | 2,363 | | 0.471 |
| 18 | 15 | D | .5 | J | 2,275 | | 0.471 |
| Control F | 15 | D | 0 | | 2,053 | | 0.430 |
| 19 | 10 | A | .4 | G | 2,675 | 11.0 | |
| Control G | 10 | A | | | 2,400 | 9.9 | |
| 20 | 10 | B | .4 | G | 2,525 | 9.9 | |
| Control H | 10 | B | 0 | | 2,475 | 9.6 | |
| 21 | 10 | C | .4 | G | 1,941 | | |
| Control I | 10 | C | 0 | | 1,807 | | |
| 22 | 10 | E | .4 | G | 2,772 | 10.3 | |
| Control J | 10 | E | 0 | | 2,747 | 9.9 | |

[1] From table I.
[2] From table II.

What is claimed is:

1. In the preparation of a yeast-raised, flour containing bakery product, which comprises preparing a dough mix from flour, yeast, water, shortening, sugar, and salt and thereafter baking said mix, the improvement which comprises incorporating with the dough ingredients from about 5–20 percent by weight based on the weight of the flour of an edible protein source containing 70–90 percent by weight protein and from about 0.1 percent to about 2.5 percent by weight of said flour of an emulsifier selected from the group consisting of succinylated monoglycerides, ethoxylated fatty acid partial esters of sorbitol and sorbitan, ethoxylated fatty acid partial and complete esters of isosorbide, ethoxylated fatty acid acyclic monohydride alcohols having 11 to 16 carbon atoms, and blends of these emulsifiers with monoglycerides, said fatty acid components in said esters and monoglycerides having 12 to 22 carbon atoms and the mol ratio of ethylene oxide to monoglyceride in said polyethoxylated derivatives being within the range of 4 to 40.

2. A method according to Claim 1 wherein said edible protein source is selected from the group consisting of fish protein concentrate, vital wheat gluten, and soybean flour and comprises from about 10–15% by weight of the fluor content.

3. A protein enriched bread dough comprising yeast, flour, sugar, salt, shortening, water, and from 5–20% based on the total weight of the flour of a protein source containing 70–90% by weight protein and from about 0.1% to about 2.5% by weight of said flour of an emulsifier selected from the group consisting of, succinylated monoglycerides, ethoxylated fatty acid partial esters of sorbitol and sorbitan, ethoxylated fatty acid partial esters and complete esters of isosorbide, ethoxylated fatty acid acyclic monohydric alcohols having 11–16 carbon atoms, and blends of these emulsifiers with monoglycerides, said fatty acid components in said esters and monoglycerides having 12–22 carbon atoms, and the mol ratio of ethylene oxide to monoglyceride in said polyethoxylated derivatives being within the range of 4 to 40.

4. A protein enriched bread dough of Claim 3 wherein said protein source is selected from the group consisting of fish protein concentrate, vital wheat gluten, and soybean flour.

References Cited

UNITED STATES PATENTS 3,780,188  12/1973  Tsen et al. _____ 426—152
3,433,645  3/1969  Egan et al. _____ 99—91 X
3,547,655  12/1970  Knightly et al. _____ 99—91

OTHER REFERENCES

Tenney et al., "Sodium Stearoyl-2 Lactylate—Its Functions in Yeast-Leavened Bakery Products," The Baker's Digest, December 1968, pp. 38–42, TX76155.

Tsen et al., "High Protein Breads—Use of Sodium Stearoyl-2 Lactylate and Calcium Stearoyl-2 Lactylate in Their Production," The Baker's Digest, April 1971, pp. 20–23, 26, 74, TX76155.

JAMES R. HOFFMAN, Primary Examiner

U.S. Cl. X.R.

426—23, 24, 25, 62

UNITED STATES PATENT AND TRADEMARK OFFICE
CERTIFICATE OF CORRECTION

PATENT NO. : 3,851,066
DATED : November 26, 1974
INVENTOR(S) : Roy Kenneth Langhans It is certified that error appears in the above-identified patent and that said Letters Patent are hereby corrected as shown below:

Column 2, line 1, "wtih" should read --with--.

Column 2, line 3, "off" should read --of--.

Column 2, line 18, "Sunccinylated" should read --Succinylated--.

Column 2, line 26, insert after "ide" the words --in mol ratios of ethylene oxide--.

Column 2, line 30, insert after with word "weight", --percent--.

Column 2, line 31, "mole" should read --mols--.

Column 4, line 34, delete the word "of".

Column 5, line 21, "compositiln" should read --composition--.

Signed and Sealed this twelfth Day of July 1977

[SEAL]

Attest:

RUTH C. MASON
*Attesting Officer*

C. MARSHALL DANN
*Commissioner of Patents and Trademarks*